Dec. 3, 1946.   F. W. QUIDAS   2,412,061
COMBINED PHONOGRAPH AND WORD DISPLAY
APPARATUS FOR TEACHING LANGUAGES
Filed Aug. 22, 1944   2 Sheets-Sheet 1
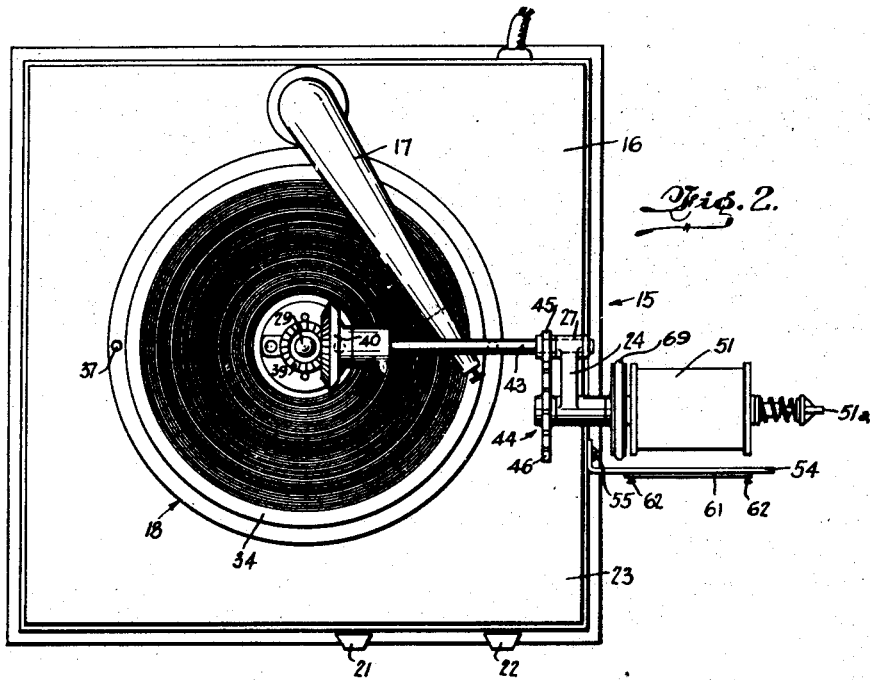
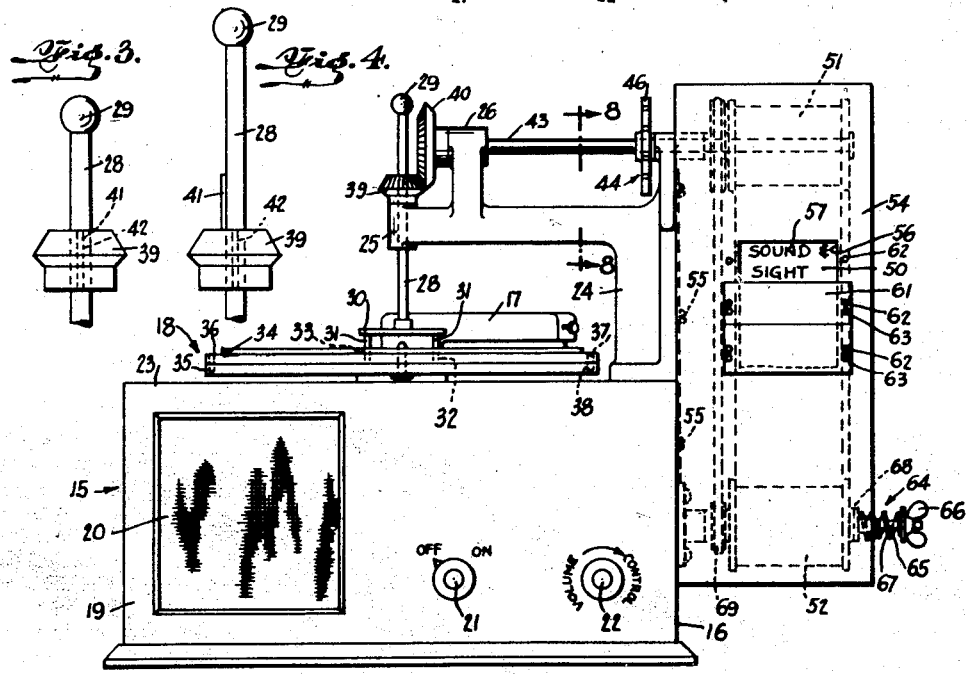
INVENTOR
FREDERICK W. QUIDAS.
BY
ATTORNEY Dec. 3, 1946. F. W. QUIDAS 2,412,061
COMBINED PHONOGRAPH AND WORD DISPLAY
APPARATUS FOR TEACHING LANGUAGES
Filed Aug. 22, 1944 2 Sheets-Sheet 2
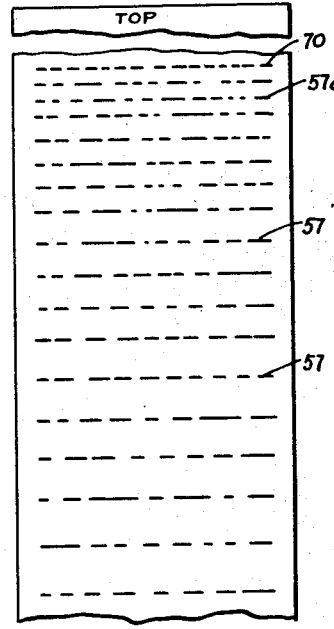
Fig. 5.
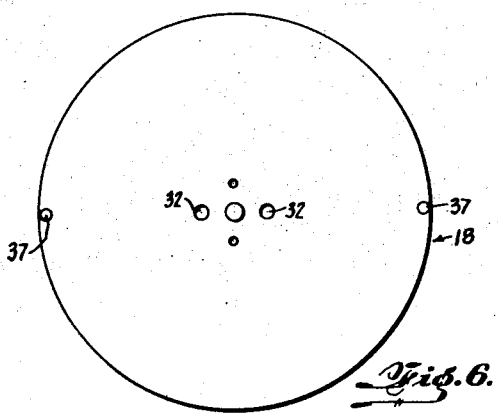
Fig. 6.
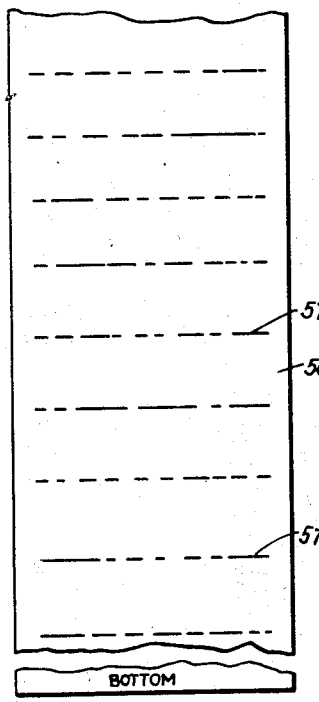
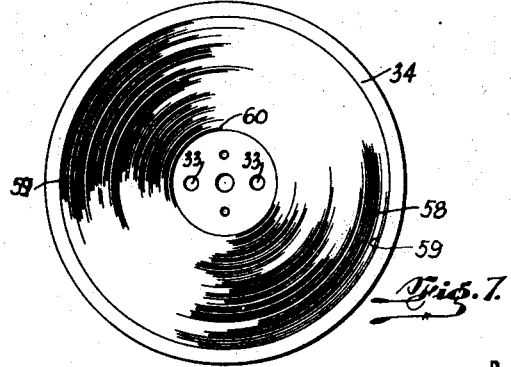
Fig. 7.
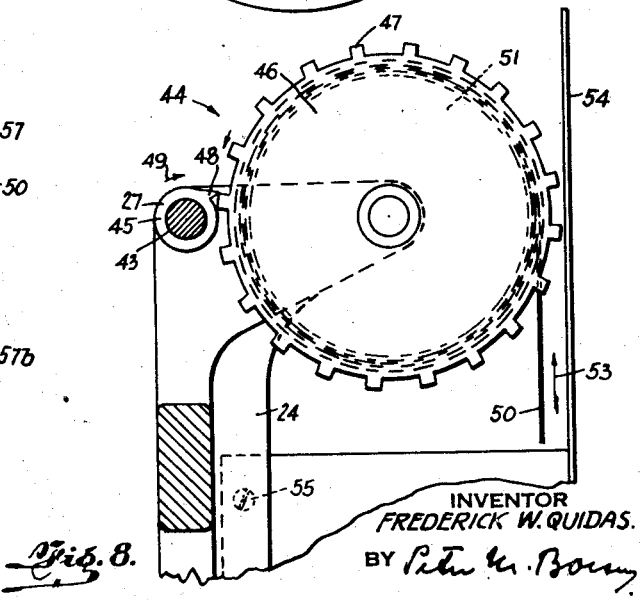
Fig. 8.
INVENTOR
FREDERICK W. QUIDAS.
BY
ATTORNEY Patented Dec. 3, 1946

2,412,061

UNITED STATES PATENT OFFICE 2,412,061

COMBINED PHONOGRAPH AND WORD DISPLAY APPARATUS FOR TEACHING LANGUAGES

Frederick W. Quidas, New York, N. Y.

Application August 22, 1944, Serial No. 550,550

7 Claims. (Cl. 35—35)

1

This invention relates to new and useful improvements in an apparatus for teaching languages, and may be adaptable for instructions in various fields.

The said instruction is imparted by means of a combined phonographic sound and picture display.

Generally, the teaching of languages by means of phonograph records is performed in such a manner that the sound from the record pronounces a certain word, letter, or numeral, foreign to the student, who follows up the same by means of a corresponding instruction book.

However, it may happen that by a momentary distraction the student loses track of which word the pronouncing record has reference to.

It is, therefore, an object of my invention to co-ordinate the word, letter or numeral of the pronouncing record with a picture display of the same and at the time pronounced.

I propose to accomplish this object by mechanical means of a comparatively simple construction.

Thus, if any part of the instruction book is to be repeated on the record, such repetition may be accomplished by co-ordinating certain markings on the record in connection with the actuating mechanism driving the record plate on the revolving turn-table; these markings are then co-ordinated with a certain mark on the device which shows the word, etc., pronounced by the phonograph record.

To accomplish the above mechanically, I propose to employ a base plate on which the phonograph record rests and is kept in a fixed position by having one or more dowel pins fastened to said base plate, said dowel pins fit in the revolving table, which is part of the phonograph outfit.

In order to obtain any certain speed of rotation of the phonograph disk various intermittent gears, that will give a "stop and go" effect to the drum carrying the lesson in picture, may be used and need not to be further described herein.

Other modifications of mechanisms may be used to cause the same effect of the "stop and go" of the lesson drum, as is now accomplished with the mechanism shown herein. As the lesson drum is detachable, it will lend itself to be placed on most machines of a different construction within the main scope hereof.

With the above and other objects in view, this invention consists of the novel features of construction, combination and arrangement of parts, hereinafter fully described, claimed and illustrated in the accompanying drawings, forming

2 part of this specification, and in which similar characters of reference indicate corresponding parts in all views, and in which:

Figure 1 is a front elevational view embodying my invention.

Figure 2 is a top plan view of Figure 1.

Figure 3 is an enlarged detail view of the gear spindle in operative, or driving position.

Figure 4 is a similar view to Figure 3, with the spindle in raised, or non-driving position.

Figure 5 is a diagrammatic view of the paper roll (with parts broken off) used for viewing the words, etc., in the operation of the device.

Figure 6 is a top plan view of the rotating table.

Figure 7 is a top plan view of a typical phonograph disk, employed in this invention.

Figure 8 is an enlarged sectional view, taken along the lines 8—8 of Figure 1, and illustrating the intermittent motion mechanism used for unwinding the paper roll.

Referring more particularly to the drawings, the numeral 15 denotes a phonograph device comprising the box 16, the tone arm 17, and the rotating table 18.

The front wall 19 is provided with the conventional sound emitting opening 20, and control knob 21 for shutting off or turning on the machine as well as the conventional volume control 22.

Secured to the top 23 of the box 15 is a suitably supporting frame 24 having a vertical bearing 25 and horizontal bearings 26 and 27. The vertical bearing 25 accommodates the gear spindle 28, which terminates at its upper end in a handle or knob 29, while the lower end of the spindle 28 terminates in a fork 30 having two downwardly projecting pins 31 engaging the openings 32 in the rotating disk 18 and the openings 33 in the phonograph record 34. The rotating disk 18 consists of the lower disk 35, conventional with phonographs, and the auxiliary top disk 36. The said disk 36 is provided with two downwardly projecting pins 37 which enter two corresponding holes 38 in the lower disk 35, thus assuring a uniform movement of the two disks 35 and 36.

Two meshing gears 39 and 40 are supported by the bearings 25 and 26; the gear 39 rides on a key 41 secured to the gear spindle 28. The gear 39 is provided with a key slot 42 to engage the key 41 when the spindle 28 is in its lowered position, as illustrated in Figure 3, at which time the pins 31 are in engagement with the rotating disk 18, thus transmitting the rotation of said disk 18 to the spindle 28, and from there to the gear 39 in mesh with gear 40, mounted on a shaft 43, which turns in the bearings 26 and 27.

When the spindle 28 is raised, as shown in Figure 4, for the purpose of exchanging the phonograph record on the disk 18, the spindle 28 may be turned slightly, so that the disengaged key 41 will pass the key slot 42, thus permitting the spindle 28 to rest on the gear 39, thus retaining the spindle 28 in its disengaged position as long as required.

The shaft 43 is provided with a ring 45 having a single tooth 48, which is adapted to engage the teeth 47 of the disc 46. Each time the shaft 43 makes one complete revolution the teeth of the disc 46 are advanced a distance equal to the spacing between any two teeth. The disc 46 is carried by the shaft 51a, on which the upper roll 51 is mounted. On the roll 51 a flexible web or strip of paper 50 is wound, and this paper is also wound on the lower roll 52. The single toothed ring 45 and the disc 46 comprise an intermittent or step-by-step movement 44, by means of which the paper or flexible web 50 is caused to advance a distance equal to the spacing between any two adjacent lines, in the direction of the arrows 53 (Fig. 8). A shield 54 is disposed in front of the rolls or drums 51 and 52, and is held in place on the box 16 by means of the holding screws 55. This shield is provided with an observation window 56, through which the characters 57, imprinted on the strip 50 may be seen.

In Figure 5 the said characters, such as words, numerals, musical notes, and other illustrations are diagrammatically indicated by a plurality of broken lines 57.

Since the said words, sentences, etc., are supposed to co-ordinate with the sound tracks 58 of the phonograph record 34, and since it is obvious that the outer groove 59 is longer than the inner groove 60 and, therefore contains more words per single rotation of the disk 18, it is necessary to provide for a greater number of such characters 57 to be visible through the window 56 at the start than at the conclusion of the playing of the record 34.

This is clearly indicated in Figure 5 by having the lines 57a closer spaced at the beginning than the lines 57b at the bottom of the strip 50.

At various instances it may become desirable to increase the height of the window 56, for which purpose a plurality of removable slats 61 are provided and secured to the shield 54 by means of screws 62 and slots 63.

The upper drum 51 is driven intermittently by the mechanism 44 and since it is advisable to prevent the lower drum 52 from freely rotating, a tension means 64 may be provided consisting of the bolt 65, a wing nut 66, and spring 67 pressing against friction washers 68.

A friction drive consisting of a flexible belt 69 and pulleys engaged thereby may also be employed.

The operation of the invention is, as follows:

Before starting playing the phonograph record 34, a paper roll 50 is secured at its top to the top drum 51 by clamping or other conventional means; the bottom end of the strip is wound upon the lower drum 52; however, care must be taken to have the first printed line 70 appear visible through the window 56.

Next, the spindle 28 is lowered into contact position with the phonograph disk 34, thus tying together or co-ordinating the rotation of the phonograph disk and the intermittent motion of the strip 50, which motion will bring to the vision of the observer through the window 56 the characters corresponding to the sound grooves 58 of the phonograph record 34.

It is obvious that some changes may be made in the form, construction and arrangement of the several parts, as shown, within the scope of the appended claims, without departing from the spirit of the invention, and I do not, therefore, wish to limit myself to the exact construction and arrangement shown and described herein.

What I claim as new, and desire to secure by Letters Patent of the United States, is:

1. An apparatus for playing a sound record and simultaneously displaying printed matter corresponding to the matter of the sound record, a phonograph having a rotating table, said rotating table comprising the conventional, rotating disk, an auxiliary disk attached to the latter, and means for securing said disks together, a phonograph record attached to the rotating table, and means for securing said phonograph record to the latter, said last means converting the rotating motion of the phonograph record through a gear arrangement to an intermittent drive, a drum secured to the shaft of the intermittent drive, and a band having characters upon its face and being mounted on said drum, and a shield provided with an adjustable window for accommodating said characters.

2. A phonograph having a rotating record table, a disc coupled to the table upon which a phonographic record may be mounted to turn, a pair of rotating drums and a flexible record strip having a take-up winding motion on one drum and an unwinding motion on the other drum, and means for imparting a step-by-step motion to the take-up drum to cause the record strip to advance step-by-step in synchronism with the rotation of the table and record supporting disc.

3. In combination, a phonograph including a sound box, a rotating table thereon and a tone arm having a reproducer, the rotating table being adapted to support and turn a flat phonographic record, a frame supported on the box and provided with a vertical bearing aligned with the center of rotation of the table, a spindle slidable in said vertical bearing and provided with a member on its lower end equipped with laterally spaced pins projecting outwardly therefrom, said pins being adapted to engage a phonographic record disposed on the table and to extend through said record and engage said table, a gear on the upper end of the spindle, a horizontal shaft turning on said frame and having a gear meshing with the spindle gear, a take-up drum mounted to turn on said frame and provided with a toothed wheel turning with said drum, a delivery drum mounted to turn on said box and provided with a flexible message carrying band wound thereon and connected to and windable on the take-up drum, said band having a series of successive word formations corresponding to the words reproduced by the phonographic action of the record moved by the table against the reproducer, and a toothed member carried by the horizontal shaft and engaging the teeth of the wheel turning with the take-up drum to cause said drum and the flexible band to have a step-by-step movement.

4. A phonograph having a rotating table and a language phonographic record turning with the table to provide sound reproduction of the language recorded by said record, a flexible band having word formations thereon disposed in cross line arrangements in spaced relation to each other, means for imparting a step-by-step movement to the flexible band in synchronism with the reproduction of the language phonographic record, and means for displaying individual word formations to enable the listener to visualize words reproduced from the turning of the phonographic record.

5. A phonograph having a rotating table and a language record thereon, a flexible band having transverse lines of word formations spaced from each other, an intermittent mechanism for moving the flexible band step-by-step, means for driving the intermittent mechanism from the rotating table, and a shield having a window through which the lines of word formations may be successively observed, said window having means for adjusting the width thereof.

6. A display strip for visualizing word formations reproduced from a moving phonographic record, consisting of a flexible strip having transverse lines of word formations spaced from each other at progressively increasing distances, means for imparting a step-by-step movement to said strip, and means for driving said means from a phonographic turn table.

7. An educational apparatus, comprising a rotary record carrying table, a phonographic language record thereon, and a reproducer arranged to follow the sound track of a language record disposed on and turning with the table; a flexible band having transverse lines of word compositions arranged in the order of the composition of a language recorded on the record, means for displaying an individual word composition of said band; and means operated by said rotary table for imparting a step-by-step motion to the band in synchronism with the rotation of the record and the reproduction of word compositions of the record, whereby a listener may visualize words reproduced by the apparatus from the record being rotated in order of their reproduction from the record while thus rotated.

FREDERICK W. QUIDAS.